J. L. GOOD.
COMPENSATING ROD CONNECTION FOR SCALES.
APPLICATION FILED DEC. 30, 1907.
910,056.  Patented Jan. 19, 1909.
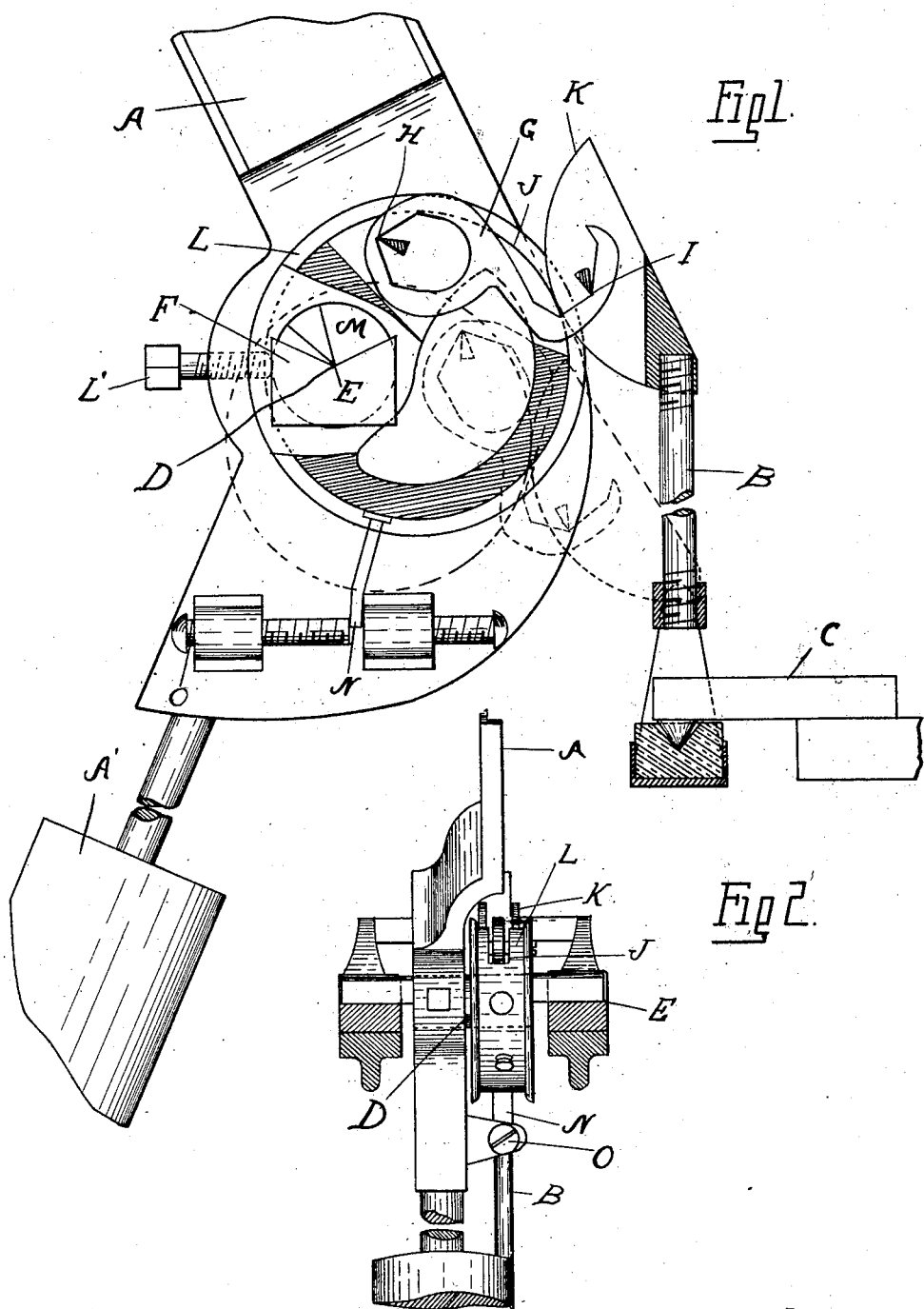
Witnesses
H. L. Ford
James P. Barry
Inventor
Jacob L. Good
By Whitmore Hulbert & Whitmore
Attys.

UNITED STATES PATENT OFFICE.

JACOB L. GOOD, OF DETROIT, MICHIGAN, ASSIGNOR TO THE COMPUTING SCALE COMPANY, OF DAYTON, OHIO, A CORPORATION OF OHIO.

COMPENSATING-ROD CONNECTION FOR SCALES.

No. 910,056.

Specification of Letters Patent.

Patented Jan. 19, 1909.

Application filed December 30, 1907. Serial No. 408,585.

*To all whom it may concern:*

Be it known that I, JACOB L. GOOD, a citizen of the United States of America, residing at Detroit, in the county of Wayne and State of Michigan, have invented certain new and useful Improvements in Compensating-Rod Connections for Scales, of which the following is a specification, reference being had therein to the accompanying drawings.

The invention relates to scales of that type in which a variable resistance is employed, and the invention has more particular reference to the transmission mechanism through which the movement of the scale platform is transferred to the index.

It is the object of the invention to obtain a compensating transmission whereby the variable movement of the weighing mechanism will correctly operate an index in connection with a scale having uniform gradations thereon, and it is a further object to effect this result without the use of flexible connections, such as steel tapes, which have heretofore been employed for the purpose.

To this end the invention consists in the peculiar construction of compensating transmission as hereinafter set forth.

In the drawings, Figure 1 is a sectional elevation of the device; and Fig. 2 is a similar view viewed at right angles to Fig. 1.

A is the index hand, B the link or rod for actuating this index, and C the lever or beam of the scale for actuating the link B. As shown, the variable resistance for the scale is in the form of a pendulum weight A', which is connected to the index A and is deflected laterally by the movement of the lever C and rod B.

The compensating transmission is arranged between the rod B and the index A, and is of the following construction: D indicates the axis of rotation of the index and pendulum weight. E are knife-edge pivots, and F are V-shaped bearings supporting said pivots. L is a member connected to the movable index and pendulum weight, and K is a coöperating member attached to the rod B, the said members being in peripheral contact with each other. The contacting surfaces of said members are so fashioned that when the member L is moved about the axis D the member K will roll in contact with the peripheral surface J of said member L, and said rolling contact surfaces are so fashioned as to produce the desired compensation in the movement of the index A, and slipping of the surfaces of the members L and K upon each other is prevented by a connection between said members which holds them in contact with each other while permitting the point of contact to travel. As illustrated, the connection between the members L and K is formed by a link G, which at one end is provided with a V-shaped bearing engaging a knife-edge pivot H on the member L, and at its opposite end has a similar bearing for engaging a knife-edge pivot I on the member B. The pivots H and I are so located upon their respective members, and in relation to the rolling contact surfaces thereof, that the distance between the knife-edges of said pivots remains constant, while the surfaces roll in relation to each other. At the same time, the link G holds the two members together so that the substantially rectilinear movement of the link B will be transformed into angular movement of the member B and the index and pendulum weight attached thereto.

In the specific construction shown, the contacting surfaces of the members L and K are arcs of circles, and the surface of the member L is eccentric to the axis D of rotation. To provide means for accurately adjusting the mechanism, the member L is preferably rotatively adjustable in relation to the index and pendent weight, and to this end the pivots E are provided with a cylindrical portion M on which the member L is secured by means of a set screw L'.

N is a finger projecting from the member L, and O are adjusting screws engaging the finger N and adapted to be adjusted in relation to the index A.

With the construction as described, the movement of the beam C will cause a downward movement of the link B and member K at the upper end thereof. This member K being held in contact with the periphery J of the member L by means of the link G it is obvious that motion will be transmitted to said member L causing the angular movement thereof and the index A and pendent weight A' attached thereto. During this movement, the rolling of the surfaces of the members L and K in contact with each other will effect a change in leverage which compensates for the varying resistance of the pendent weight A' so that an indicator, having uniform gradations, may be employed in connection with the index A.

What I claim as my invention is:

1. In a scale, a compensating transmission comprising an angularly movable member and a substantially vertically movable actuating member therefor, having their peripheral surfaces in rolling contact with each other and a link connecting said members for holding the same in contact.

2. In a scale a compensating transmission comprising an angularly movable member, an index arm operatively connected to said member, an actuating rod, an actuating member carried by said rod having its peripheral surface in rolling contact with the angularly movable member, and a link connecting said members at points which remain at constant distances from each other during the rolling contact of the surfaces of said members.

3. In a scale, a compensating transmission comprising an angularly movable member and substantially vertically movable actuating member therefor having rolling contact surfaces eccentric to the axis of rotation of said angularly movable member, a link for connecting said members, and knife-edge pivots on the respective members engaging said link and arranged at points which remain at constant distance from each other during the rolling contact of said surfaces.

4. In a scale, a compensating transmission comprising an angularly movable member having its peripheral surface eccentric to the axis of rotation, an index arm operatively connected to said member, an actuating rod a member carried by said rod, having its surface in rolling contact with the surface of said angularly movable member, and a link connecting relatively fixed points in said members for holding the same in contact with each other and for preventing slippage between said surfaces.

In testimony whereof I affix my signature in presence of two witnesses.

JACOB L. GOOD.

Witnesses:
JAMES WHITTEMORE,
EDGAR A. ROOD.